Patented May 9, 1950

2,507,200

UNITED STATES PATENT OFFICE 2,507,200

PROCESS FOR RENDERING MATERIALS WATER-REPELLENT AND COMPOSITIONS THEREFOR

John R. Elliott and Robert H. Krieble, Schenectady, N. Y., assignors to General Electric Company, a corporation of New York No Drawing. Application February 10, 1945, Serial No. 577,341

15 Claims. (Cl. 117—121)

The present invention relates broadly to the treatment of materials. More particularly it is concerned with the production of water-repellent materials by treating solid bodies which are normally water-non-repellent with a composition comprising a water-soluble siliconate.

A rapid and economical method of treating materials to waterproof them is described in U. S. Patent 2,306,222, issued to Winton I. Patnode, and assigned to the same assignee as the present invention. In accordance with the methods described therein, solid bodies which normally are wetted by water (that is, water-non-repellent bodies) are contacted with an organosilicon halide (or mixture of organosilicon halides) in vapor form. The thus treated bodies are then brought into contact with an alkaline reagent, for example, ammonia, to neutralize any acid that may be present as a result of the treatment of the bodies with the organosilicon halide.

Although exceptionally water-repellent products are obtained by the method involving the use of organosilicon halides, it has been difficult without controlled neutralization to maintain the original tensile strength of treated cellulosic materials such as cloth and paper due to the effect thereon of the hydrochloric or other halogen acid evolved when the organosilicon halides react with the moisture or the hydroxyl groups of the cellulose or with the moisture of the air after treatment.

The present invention is based on the discovery that by treating water-non-repellent materials with compositions containing water-soluble siliconates, products can be obtained possessing all the desirable water-repellent properties of similar materials treated with organosilicon halides and in addition, in the case of cellulosic materials, exhibiting little or no loss in strength as a result of the treatment.

The alkali siliconates employed in the practice of the present invention are prepared from siliconic acids, monoorganosilanetriols, or their condensation products and are described, for example, by Meads and Kipping, Journal of Chemical Society, 105, 679. Whereas it appears that the so-called siliconic acids generally are only hypothetical compounds, there is considerable evidence that when their condensation products, the polysiloxanes, are dissolved in a solution of a strong water-soluble base, the resultant solutions do contain the salts of these acids.

The siliconates can be prepared, for example, by hydrolyzing derivatives of a monohydrocarbon-substituted silane containing three hydrolyzable radicals such as halogen atoms, alkoxy groups, etc., connected to silicon, recovering the hydrolysis products, and dissolving these products in a solution of a strong inorganic base, i. e., a solution of the bases of the alkali metals and of barium, calcium, and strontium, in such proportions that there is at least one equivalent of base per silicon atom. The resultant solution containing the soluble siliconate is diluted to the desired concentration, partially neutralized if desired, and is applied to the water-non-repellent materials by dipping, spraying, or other suitable means. The treated material is thereafter dried, preferably under mildly acid condition. The treated products are highly water-repellent. In the case of porous materials no substantial reduction in porosity is noted. In general, an after-washing of treated materials further improves the water-repellent properties thereof, although such washing is not essential to the practice of the present invention. A particular advantage of the present method is its simplicity and freedom from acidic by-products which renders it suitable for general applications without employing any special equipment for handling or disposing of acid vapors, etc.

In order that those skilled in the art may better understand how the present invention may be carried into effect, the following illustrative examples are given:

*Example 1*

One mol of methyltrichlorosilane was hydrolyzed by being rapidly added to a violently stirred mixture of 1 kg. crushed ice and 1 kg. of water. The resultant solution was allowed to stand until substantially all the polymonomethylsiloxanes were precipitated in the form of a fine powder. This powder was filtered from the remaining solution and dissolved by shaking with 200 cc. of 5 normal aqueous sodium hydroxide. The resultant alkaline solution was stable, although the polysiloxane resin could be precipitated from the solution by acids including such weak acids as carbon dioxide and disodium acid phosphate.

The above solution was diluted to a concentration of between 0.05 and 1.0 molar with respect to the sodium methylsiliconate. Various types of cellulose fiber materials such as cloth and paper, when impregnated with this dilute solution and dried in air at room temperature, became highly repellent to water with substantially no reduction in porosity. When the drying process was accelerated by placing the treated materials in an oven held at elevated temperatures, some reduction in the water-repellency resulted. However, this result could be avoided either by partially neutralizing the sodium siliconate solution with a dilute acid just prior to treatment of the cellulosic material or by neutralizing the solution after application, for example by contacting the treated material with a gas rich in carbon dioxide. A further improvement in the water-repellency of the treated materials was obtained by a short washing thereof with a dilute aqueous soap solution followed by several rinses with clear water.

An alternative method of rendering paper water-repellent comprises the addition of the dilute soluble siliconate to the paper pulp during the beating process. By this method the individual fibers are rendered water-repellent and this property is carried through into the final sheet.

*Example 2*

One mol of ethyltrichlorosilane was run into a well stirred mixture of 1 kg. ice and 1 kg. water over a period of about 2 minutes. When the stirring was stopped at the end of the addition, a clear sol formed which rapidly grew turbid and began to precipitate large white flakes of ethylpolysiloxane. The precipitate was filtered from the remaining solution and dissolved in a solution of 1 mol sodium hydroxide in a mixture of 200 cc. water and 100 cc. 95% alcohol. The alcohol was found to facilitate the solution of the ethylpolysiloxane.

Approximately six parts by volume of this 3.4 molar sodium ethylsiliconate solution was diluted with 100 parts water. A cotton poplin cloth was immersed in the solution for one minute, dried by being exposed to air at room temperature for several hours, and was then washed with a dilute soap solution, rinsed and dried in an oven maintained at a temperature of around 100° C. The treated cloth was substantially unchanged in handle or appearance, and was found to be highly water-repellent. A piece of filter paper dipped into the same solution and air dried in the same manner would no longer absorb water and retained its tensile strength after immersion in water.

*Example 3*

One mol of phenyltrichlorosilane was run rapidly into a violently stirred slurry of 1 kg. chopped ice and 1 kg. of water. The resultant solution soon began to deposit an insoluble phenylpolysiloxane as a sticky white solid. After standing overnight the aqueous phase was decanted and the solid dissolved in a solution of 1 mol potassium hydroxide in a mixture of 200 cc. 95% alcohol and 50 cc. water. The resultant potassium phenylsiliconate was diluted to 0.2 molar concentration with water to form a turbid colloidal solution. When a water-ethyl alcohol mixture containing 60 per cent by volume alcohol was used as the diluent a clear solution was obtained. Cotton poplin cloth immersed in either the turbid or the clear solution, and thereafter washed and again dried as described in Example 2, was found to be water-repellent and somewhat stiffer than the untreated cloth, but was otherwise unchanged in appearance or physical properties. Similar results were obtained by treating filter paper in like manner.

*Example 4*

Fifteen grams (0.05 mol) of barium hydroxide hydrate was dissolved in water and heated under reflux with 6.7 grams (0.1 mol) of the product obtained by the hydrolysis of methyltrichlorosilane in ice and water as described in Example 1. The solution was filtered to remove suspended matter. On treatment of this solution with ammonium chloride the silicone separated as an acid insoluble precipitate. Cellulosic materials dipped in the barium siliconate solution and dried were highly repellent to water.

In a like manner the siliconates of calcium and strontium may be prepared and applied to water-non-repellent materials.

It has also been found that treated cellulosic materials having a much softer texture than either the untreated materials or those treated with the unmodified siliconates can be obtained by use of a treating solution containing in addition to the siliconate a solution of a diorganosilanediol or its corresponding silicone condensation product in a strong base. These modifiers, which are believed to consist essentially of diorganosiliconeates, i. e., salts of the diorganosilanediols and the strong base, may be prepared in a manner similar to that used in preparing the siliconates, that is, by dissolving in caustic solution a silicone containing the recurring structural unit

where R and R' represent the same or different lower alkyl or aryl radicals such as methyl, ethyl, propyl, phenyl, etc., radicals, and $n$ is a whole number equal to at least one. Alternatively the modifier may be prepared by employing a basic solution as the hydrolysis medium for the diorganosilicon halide or other hydrolyzable diorganosilicon derivative from which the silicone is prepared. The preparation of a specific modifier of this type and its use in the practice of the present invention is described more fully in the following example:

*Example 5*

One-half mol of dimethyldichlorosilane was run into an agitated externally cooled solution of 1.5 mols sodium hydroxide in 150 gm. water. The resultant product was filtered to remove the precipitated sodium chloride and the filtrate was found to consist of an oily layer of dimethylsilicone and an aqueous phase. After separation of the oily layer, the aqueous phase was found to contain about 2 mols of alkali per dimethylsilicone unit, i. e. per silicon atom, and was believed to comprise the sodium salt of dimethylsilanediol, i. e. a sodium dimethylsiliconeate.

An alternative method of preparing these siliconeates comprises dissolving the oily silicone in an alcoholic solution of potassium hydroxide or equivalent alkali in the ratio of at least one mol of the alkali hydroxide per silicon atom.

In general the solutions comprising organosilicone units containing two hydrocarbon radicals connected to each silicon atom are not as stable as the corresponding siliconates. Their stability can be improved either by employing the base in an equivalence ratio in excess of one equivalent per silicon atom, or by use of an alcoholic solution of the alkalis, or both.

The modifiers (i. e., the metallic salt of the dihydrocarbon-substituted silanediols) prepared from the silicones can be used in various proportions with the soluble siliconates. In general the greater the proportion of the silicone products, the softer the feel or handle of the treated cloth or other fibrous material. Satisfactory results have been obtained when the solutions contained as high as 80 to 90 mol per cent of the modifier mentioned above and 10 to 20 mol per cent of the soluble siliconates, the mol percentage of the modifier being calculated on the theory that it was present primarily as the mono-basic salt of the diorganosilanediol. For example, a solution of 0.25 mol sodium methylsiliconate and 0.25 mol of the sodium salt of diethylsilicol was partially neutralized by the addition of 0.25 mol of dilute sulphuric acid and was thereafter applied to cotton poplin cloth. The treated cloth was dried in a current of room air and was then heated for 10 minutes at 100 degrees C. The resultant products were completely water-repellent. Washing with dilute soap solution followed by a clear water rinse further improved their water-repellency. Similar results were also obtained with treating solutions wherein the sodium methylsiliconate and the modifying siliconeate were present in different proportions. The only difference in the treated products being in the feel or handle of the cloth which became softer as the relative proportions of the siliconeate was increased.

Although the present invention is particularly adapted to the treatment of cellulosic fibrous materials, it may also be employed with other water-non-repellent bodies, such as glass, porcelain, and other ceramics, wood, asbestos, etc., to render such materials water-repellent. The procedure is the same as that employed in the treatment of cellulosic materials.

While a siliconate of a strong base is an essential ingredient of the composition employed in the practice of the present invention, it is not necessarily the sole metal component thereof. It has been found that other metal ions in what appear to be complex metallo-siliconates can be prepared by the addition of salts of metals such as iron, lead, zinc, silver, and copper to the soluble siliconates. Many of these are useful in water-repellency applications. The products obtained by addition of soluble copper salts to alkali siliconates in less than molar proportions are particularly useful in that cellulosic materials treated with such products are not only water-repellent but are also mildew resistant. The preparation of such treating solutions and their application to cellulosic materials is illustrated in the following example:

*Example 6*

A 0.4 molar solution of sodium methylsiliconate was mixed with a solution of copper sulphate in the ratio of 10 mol per cent copper sulphate per mol sodium methylsiliconate. The resultant product was a clear deep blue solution. The fact that no copper hydroxide was precipitated indicated the formation of a complex sodium copper-siliconate. Cotton cloth when treated with this solution following the procedure set forth in Example 1 possessed the same degree of water-repellency as cotton cloth treated with the unmodified sodium methylsiliconate. Neither its water-repellency nor tensile strength was essentially affected by burial for 15 days in garden soil. In contrast an untreated sample of the same cloth was practically decomposed by 15 days' burial, while cloth treated with the unmodified sodium methylsiliconate had lost practically all its tensile strength but not its water-repellency after burial for the same length of time.

While the invention has been described with specific reference to the treatment of textiles, paper, glass, etc., with siliconates wherein the hydrocarbon radicals attached to silicon are methyl, ethyl, or phenyl radicals, it will be obvious that siliconates containing lower alkyl or aryl radicals other than these specific radicals may also be employed. In general, from the standpoint of solubility and ease of manipulation the lower alkyl siliconates, particularly the sodium or potassium methylsiliconates, are preferred. Likewise modifiers other than the siliconeates obtained from dimethylsilicone can also be employed. Examples of other suitable modifiers are those obtained by dissolving the diethyl, dipropyl, diphenyl, methyl ethyl, methylphenyl-silicones and the like in aqueous or alcoholic solutions of sodium hydroxide, potassium hydroxide, or other strong bases.

It is to be understood also that such modifiers may be employed with soluble siliconates or the complex metallo-siliconates containing the same or different Si-hydrocarbon radicals, the selection depending to some extent on the relative stability and solubility of the modifier with reference to the particular siliconate or siliconates employed. The modified solutions obviously may be prepared by solution in a strong base of the products obtained by cohydrolysis of the mixed silanes such as a mixture of methyltrichlorosilane and dimethyldichlorosilane.

In general best results appear to be obtained when the treating solutions are of a concentration of from about 0.5 to 1.0 molar with respect to the siliconate or the total silicon units in a mixture of soluble siliconates and siliconeates. However, the invention is not limited to these proportions as acceptable products have been obtained with treating solution concentrations ranging from approximately 0.01 molar to more than 5 molar depending to some extent on the amount of solution picked up and retained by the material being treated. With solutions of higher concentrations, care should be taken to avoid gross flocculation of the polysiloxanes on the base material as such flocs impart no water-repellency. The usual precaution to be taken is to dry rapidly with high velocity air at low wet bulb temperatures.

What we claim as new and desire to secure by Letters Patent of the United States is:

1. The process of rendering a non-water-repellent material water-repellent which comprises (1) treating said material with a composition comprising an aqueous solution of a water-soluble metallic salt of a hydrocarbon-substituted silanetriol, the metal ion of said salt being a member selected from the class consisting of alkali metals and alkaline earth metals, and (2) causing the formed hydrocarbon-substituted polysiloxane on the surface of the treated material to become water-insoluble by drying the treated material under mildly acidic conditions whereby the treated material becomes water-repellent.

2. The process of rendering a non-water-repellent material water-repellent which comprises (1) treating said material with a composition comprising (a) an aqueous solution of a water-soluble metallic salt of a hydrocarbon-substituted silanetriol, the metal ion of said salt being a member selected from the class consisting of alkali metals and alkaline earth metals and (b) an inorganic water-soluble salt of a metal selected from the class consisting of iron, lead, zinc, silver and copper, and (2) causing the formed hydrocarbon-substituted polysiloxane on the surface of the treated material to become water-insoluble by drying the treated material under mildly acidic conditions whereby the treated material becomes water-repellent.

3. The process of rendering a non-water-repellent material water-repellent which comprises (1) treating said material with a composition comprising an aqueous solution containing (a) from 10 to 50 mol per cent of a water-soluble metallic salt of a hydrocarbon-substituted silanetriol and (b) from 50 to 90 mol per cent of a water-soluble metallic salt of a dihydrocarbon-substituted silanediol, the metal ion of the said metallic salts of (a) and (b) being a member selected from the class of alkali metals and alkaline earth metals, and (2) causing the formed hydrocarbon-substituted polysiloxanes on the surface of the treated material to become water-insoluble by drying the treated material under mildly acidic conditions whereby the treated material becomes water-repellent.

4. The process of rendering a non-water-repellent material water-repellent which comprises (1) treating said material with a composition comprising an aqueous solution containing (a) from 10 to 50 mol per cent of a water-soluble alkali-metal salt of methylsilanetriol and (b) from 50 to 90 mol per cent of a water-soluble alkali-metal salt of dimethylsilanediol, and (2) causing the formed methylpolysiloxanes on the surface of the treated material to become water-insoluble by drying the treated material under mildly acidic conditions whereby the treated material becomes water-repellent.

5. The process of rendering a cellulosic material water-repellent which comprises (1) treating said material with a composition comprising an aqueous solution of a water-soluble metallic salt of an alkyl-substituted silanetriol, the metal ion of the said salt being a member selected from the class consisting of alkali metals and alkaline earth metals, and (2) causing the formed alkyl polysiloxane on the surface of the treated material to become water-insoluble by drying the treated material under mildly acidic conditions whereby the treated material becomes water-repellent.

6. The process of claim 5 wherein the metal ion of the metallic salt is barium.

7. The process of rendering a cellulosic material water-repellent and fungus resistant which comprises (1) treating said material with a composition comprising (a) an aqueous solution of a water-soluble alkali-metal salt of methylsilanetriol and (b) a water-soluble inorganic copper salt, and (2) causing the formed methylpolysiloxane on the surface of the treated material to become water-insoluble by drying the treated material under mildly acidic conditions whereby the treated material becomes water-repellent.

8. The process of rendering a cellulosic material water-repellent which comprises (1) treating said material with a composition comprising an aqueous solution containing (a) from 10 to 50 mol per cent of a water-soluble alkali-metal salt of methylsilanetriol and (b) from 50 to 90 mol per cent of a water-soluble alkali-metal salt of dimethylsilanediol, and (2) causing the formed methylpolysiloxanes on the surface of the treated material to become water-insoluble by drying the treated material under mildly acidic conditions whereby the treated material becomes water-repellent.

9. The process of rendering a cellulosic material water-repellent which comprises (1) treating said material with a composition comprising an aqueous solution of (a) from 10 to 50 mol per cent of a water-soluble alkali-metal salt of methylsilanetriol and (b) from 50 to 90 mol per cent of a water-soluble alkali-metal salt of dimethylsilanediol, and (2) causing the formed methylpolysiloxanes on the surface of the treated material to become water-insoluble by drying the treated material under mildly acidic conditions comprising an atmosphere of carbon dioxide whereby the treated material becomes water-repellent.

10. A composition for rendering materials water-repellent and for improving the feel of said materials, said composition comprising an aqueous solution containing (1) from 10 to 50 mol per cent of a water-soluble metallic salt of a hydrocarbon-substituted silanetriol, (2) from 50 to 90 mol per cent of a water-soluble metallic salt of a dihydrocarbon-substituted silanediol, each metal ion of the metallic salts in (1) and (2) being a member selected from the class consisting of alkali metals and alkaline earth metals, and (3), in combination therewith, a water-soluble inorganic copper salt in an amount equal to 10 mol per cent based on the metallic salt of the silanetriol.

11. A composition for rendering materials water-repellent and for improving the feel of said materials, said composition comprising (1) from 10 to 50 mol per cent of a water-soluble alkali-metal salt of a hydrocarbon-substituted silanetriol and (2) from 50 to 90 mol per cent of a water-soluble alkali-metal salt of a dihydrocarbon-substituted silanediol.

12. A composition for rendering materials water-repellent and for improving the feel of said materials, said composition comprising an aqueous solution comprising (1) from 10 to 50 mol per cent of a water-soluble alkali-metal salt of a hydrocarbon-substituted silanetriol, (2) from 50 to 90 mol per cent of a water-soluble alkali-metal salt of a dihydrocarbon-substituted silanediol, and (3) an inorganic water-soluble copper salt, the ingredients (1), (2) and (3) being dissolved in the said solution.

13. A composition for rendering materials water-repellent and for improving the feel of said materials, said composition comprising an aqueous solution containing (1) from 10 to 50 mol per cent of a water-soluble metallic salt of an alkylsilanetriol, (2) from 50 to 90 mol per cent of a water-soluble metallic salt of a dialkylsilanediol, the metal ions of (1) and (2) each being a member selected from the class consisting of alkali metals and alkaline earth metals, and (3) an inorganic water-soluble metal salt, the metal ion of which is a member selected from the class consisting of copper, zinc, iron, lead, and silver.

14. A composition for rendering materials water-repellent and for improving the feel of said materials, said composition comprising an aqueous solution containing (1) from 50 to 90 mol per cent of a water-soluble alkali-metal salt of dimethylsilanediol, (2) from 10 to 50 mol per cent of a water-soluble metallic salt of methylsilanetriol wherein the metal ion of the metallic salt is a member selected from the class consisting of alkali metals and alkaline earth metals, and (3) a water-soluble inorganic metal salt wherein the metal ion is a member selected from the class consisting of copper, zinc, iron, lead, and silver.

15. A composition for rendering materials water-repellent and for improving the feel of said materials, said composition comprising an aqueous solution containing (1) from 10 to 50 mol per cent of a water-soluble sodium salt of methylsilanetriol, (2) from 50 to 90 mol per cent of a water-soluble sodium salt of dimethylsilanediol, and (3) an inorganic water-soluble copper salt.

JOHN R. ELLIOTT.
ROBERT H. KRIEBLE.

REFERENCES CITED

The following references are of record in the file of this patent:

UNITED STATES PATENTS

| Number | Name | Date |
|---|---|---|
| 152,903 | Gender | July 14, 1874 |
| 2,306,222 | Patnode | Dec. 22, 1942 |
| 2,386,259 | Norton | Oct. 9, 1945 |

FOREIGN PATENTS

| Number | Country | Date |
|---|---|---|
| 549,081 | Great Britain | Nov. 5, 1942 |

OTHER REFERENCES

Meads et al.: J. Chem. Soc. (London), vol. 105, 1914, pp. 679, 684 and 688.

Meads et al.: J. Chem. Soc. (London), vol. 107, 1915, pp. 459, 465 and 468.

Stock et al.: Berichte Deut. Chem. Gesel., vol. 52, 1919, pages 695, 708 and 723.

Chem. and Engineering News, vol. 24, No. 9, May 10, 1946, pages 1233 and 1234.